Jan. 16, 1923. 1,442,266.

L. S. GRAHAM ET AL.
MEANS EMPLOYED IN TOTALIZING DATA.
FILED OCT. 24, 1919.
4 SHEETS—SHEET 1.

Fig. 1.

Inventor
Louis S. Graham
John W. Roberts and
Stanley Wood

By Joshua R. H. Potts
Attorney

Figures 4, 5:
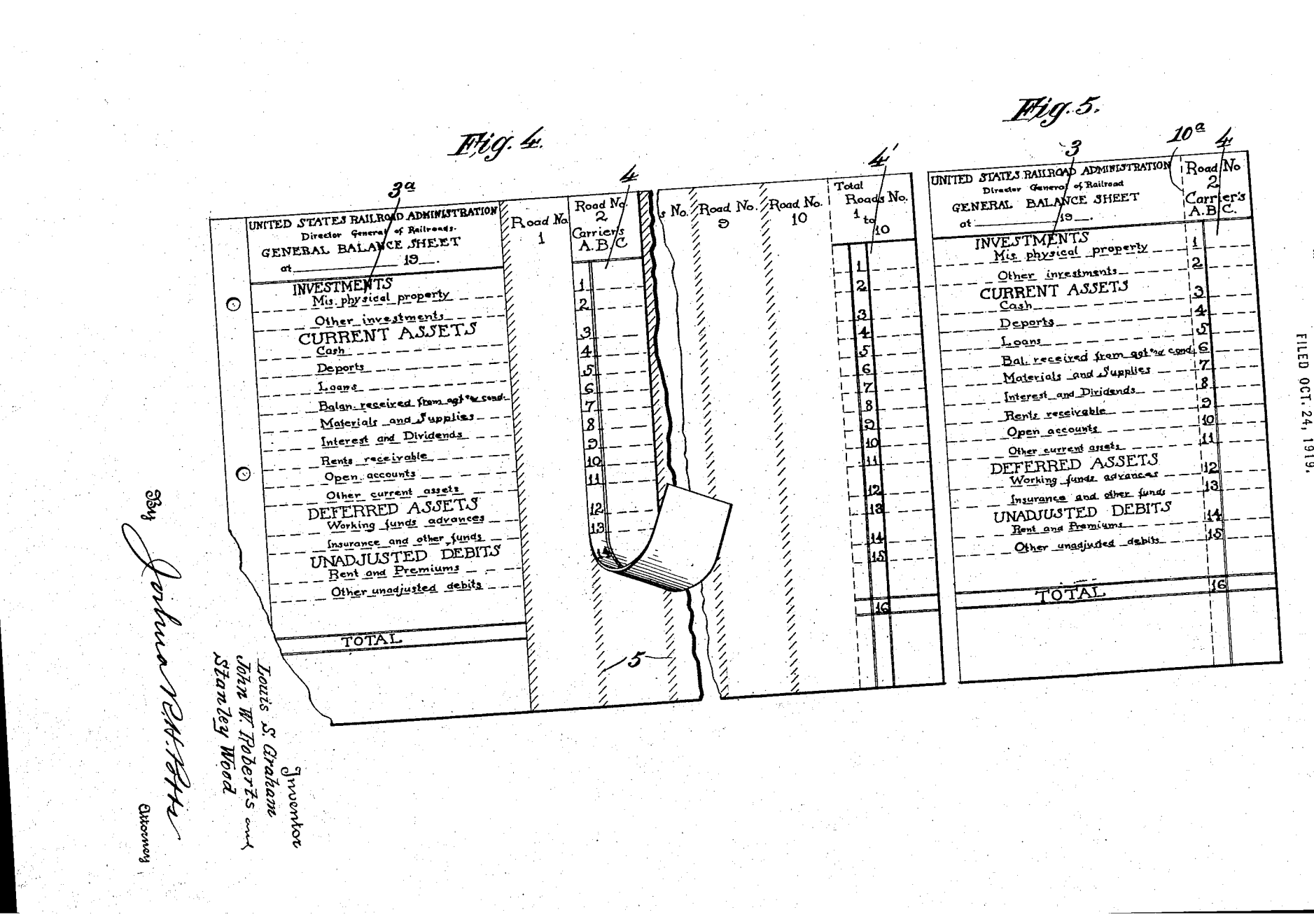

Jan. 16, 1923. 1,442,266.
L. S. GRAHAM ET AL.
MEANS EMPLOYED IN TOTALIZING DATA.
FILED OCT. 24, 1919. 4 SHEETS—SHEET 3.

Inventor
Louis S. Graham
John W. Roberts and
Stanley Wood

By Joshua R. H. Potts
Attorney

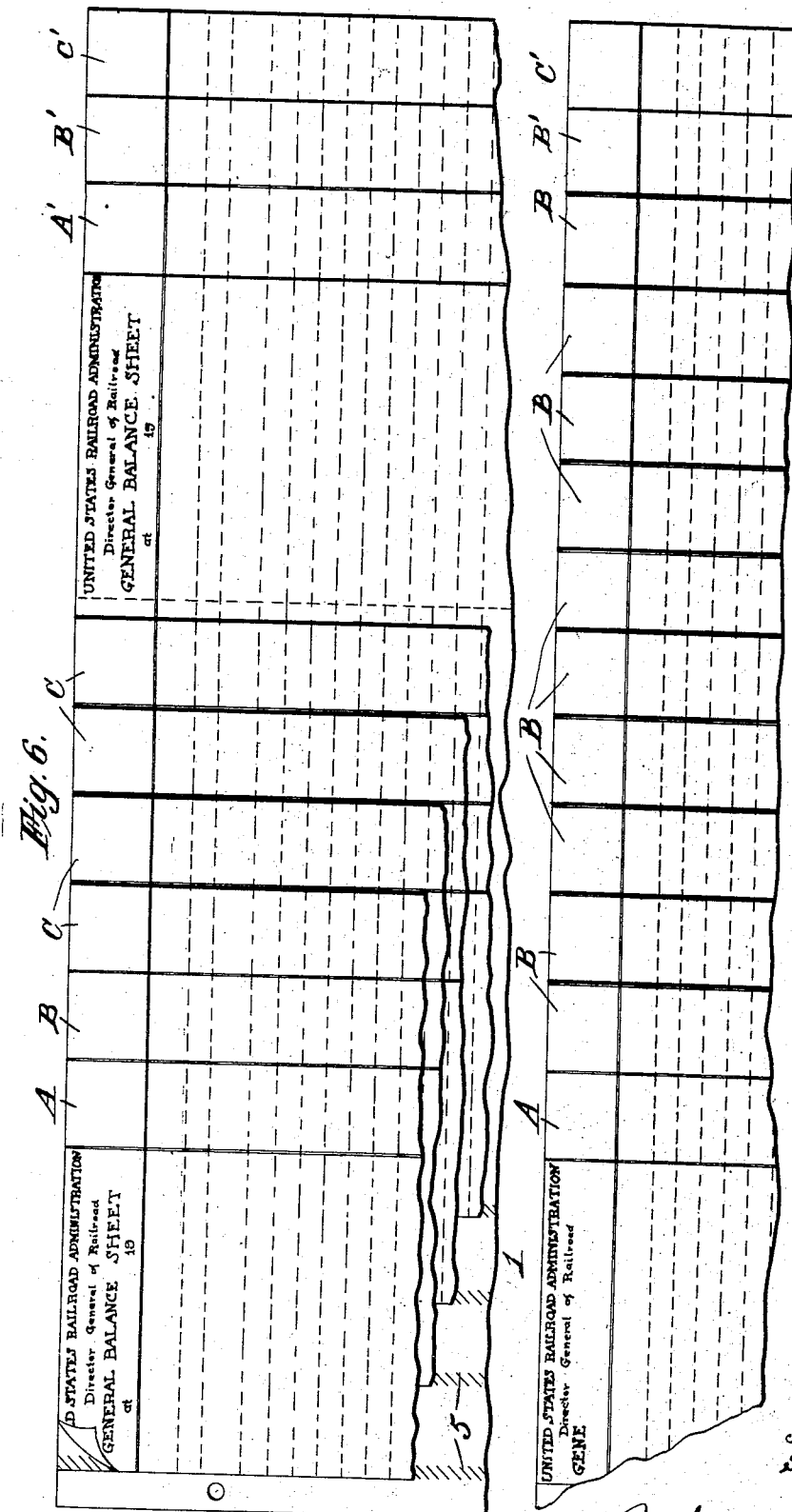

Patented Jan. 16, 1923.

1,442,266

UNITED STATES PATENT OFFICE.

LOUIS S. GRAHAM, JOHN W. ROBERTS, AND STANLEY WOOD, OF WASHINGTON, DISTRICT OF COLUMBIA.

MEANS EMPLOYED IN TOTALIZING DATA.

Application filed October 24, 1919. Serial No. 333,017.

*To all whom it may concern:*

Be it known that we, LOUIS S. GRAHAM, JOHN W. ROBERTS, and STANLEY WOOD, citizens of the United States, residing at Washington, District of Columbia, have invented certain new and useful Improvements in Means Employed in Totalizing Data, of which the following is a specification.

Our invention relates to an improved system for accumulating and totalizing numerically expressed data acquired from different sources or from the same source at different times.

Our invention is adapted for use in conjunction with or as part of a bookkeeping or accounting system, to collect and totalize election returns, or for any other use where it is necessary or desirable to totalize reports or data received from different sources.

The object of our invention is to provide a system of the character mentioned whereby information or data obtained from more than one source may be rapidly and accurately totalized, by the elimination of any transcribing or re-arranging of the basic data for that purpose. A further object of our invention is to provide a system whereby the original records and data shall be preserved and become a part of the permanent records. A further object of our invention is to provide a system whereby each report as received from the various departments, branches, or sources may be immediately placed in its proper location regardless of the order in which they are received. Other objects will appear hereinafter.

In carrying out our invention the various reports are made upon uniform blanks and a master sheet is provided having means for securing thereto the original report sheets in overlapping position, exposing but the column or columns of numerical data. As these are uniform blanks, it is obvious that the figures relating to the same item will fall in horizontal columns where they may be totalized at the margin of the master sheet either mentally or by means of an ordinary tabulating machine. Our invention, therefore, consists in a master sheet provided with means for attaching thereto in sequence data obtained from various sources and provided with spaces for totalizing the said data. Should the data be received from too many sources to be accommodated conveniently on a single master sheet, a number of master sheets may be employed and the totalized columns from these master sheets may be detached and secured in a similar manner to a recapitulation sheet similar to the master sheet and whereon the grand total may be totalized. If desired, the basic reports may be formed on blanks wherein the column or columns for the figures may be detachable and these detachable portions may be secured to the master sheet in order instead of overlapping the entire report sheets as above described. It is also obvious that if the data is necessarily contained in two or more columns that the same system may be employed and the totals of the several columns may be made separately by folding the report sheets so as to expose the corresponding columns in order.

Our invention will be more readily understood by reference to the accompanying drawings forming a part of this specification and in which—

Figure 1 is a plan view of a master sheet embodying the invention, illustrating several report blanks secured thereto, portions thereof being broken away to better illustrate the invention.

Figure 2 is a longitudinal section of the same.

Figure 3 is a plan view of the upper portion of a recapitulation sheet such as is used where large numbers of reports are to be totalized.

Figure 4 is a plan view of a modified form of master sheet.

Figure 5 is a plan view of a report blank to be used in conjunction therewith.

Figure 6 is a view similar to Figure 1, illustrating a modified form wherein the report blanks contain a plurality of columns of data.

Figure 7 is a plan view of the upper portion of the same, illustrating all of the report blanks attached to the master sheet and with the right-hand column folded under in each sheet to totalize the second column, and Figure 8 is a longitudinal section of Figure 7.

Referring now to Figures 1 and 2 of the drawings, 1 indicates the master sheet, and 2 the report sheets secured thereto. The report sheets are uniform blanks having a column 3 containing the items upon which the report is to be made and a column 4 to contain the numerically-expressed report. The master sheet 1 at the right-hand side is preferably formed with a similar column 3', stating the various items and a column 4' in which the figures contained in the several columns 4 are totalized. To the left of the column 3, the master sheet 1 is provided with means for securing the report sheets 2 thereto in overlapped position, as shown in Figures 1 and 2, with the columns 4 exposed. This means preferably comprises gummed lines 5. By moistening the under side of the extreme edge of a sheet and placing it in proper position on the gummed line 5, the original report sheet is readily secured in position. At the extreme left the sheet 1 may be provided with a binding margin 6. Each report should bear indicia 7 indicating its source, and the sheet 1 is provided with corresponding indicia 8 indicating where each sheet should be positioned. By this means each report when received may be placed in its proper position irrespective of the order in which they are received. It is obvious that after all of the report sheets for a single master sheet are received, the total may be readily ascertained in the horizontal columns and placed in the column 4'.

If a larger number of report sheets are employed than can be conveniently accommodated upon a single master sheet, a recapitulation sheet 9 is employed similar to the master sheet 1, except that the indicia 8' thereon corresponds to indicia 8ª at the top of column 4', and a line of perforations or scoring 10 is provided at the left of column 3' of the master sheet whereby the columns 3' and 4' may be readily detached and secured to the recapitulation sheet 9. It is obvious that this may be carried out as far as necessary to accommodate any number of reports. To this end, the right-hand portion of the recapitulation sheet is also scored or perforated as at 10'.

As illustrated in Figures 4 and 5, we have shown a modified form wherein the items appearing in column 3' of the master sheet are printed at the left-hand side of the sheet in a column 3ª and the column 4' for totalizing is at the extreme right as in the first described form. Intermediate the columns 3ª and 4' lines of gum 5 are provided. The blank form used with this modification contains a line of perforations or scoring 10ª between the columns 3 and 4, so that the column of figures 4 may be readily detached and secured in position by means of the gum 5, as shown clearly in Figure 4 wherein one of the columns 4 is shown partially secured in position. A form of this character is less bulky for binding or filing than that shown in Figures 1 to 3 inclusive. It is obvious that the use of the device is identical with that before described.

In Figures 6 to 8 inclusive we have illustrated a further modification for use where it is necessary to make the original reports on sheets containing two or more columns of numerical data. As shown in said figures, we have illustrated the report sheets as containing three columns A, B and C. With this form of the device, the master sheet 1 is provided at the right-hand side with columns A', B' and C' corresponding to the report blanks. The several report sheets are secured to the master sheet as in the form illustrated in Figures 1 to 3. When it is desired to totalize columns A, the columns B and C are folded under. When it is desired to totalize columns B, the columns C are folded under as illustrated in Figures 7 and 8; and when it is desired to totalize column C the sheets are unfolded or left in their original flat form. In either event it brings the columns A', B' or C' at the right of the last column A, B or C, respectively, of the report sheets so that they may be readily totalized.

We claim:—

1. In a system of the class described, a master sheet in combination with a plurality of like report sheets bearing data similarly arranged, said master sheet being provided with laterally spaced means for attaching said report sheets thereto and said master sheet being provided with an appropriately designated totalization column for the items on said report sheets, substantially as described.

2. A device as set forth in claim 1 in which the report sheets contain numerically-expressed data adjacent one edge thereof, and the attaching means on the master sheet being laterally spaced so as to expose the numerically-expressed data, substantially as described.

3. A device as set forth in claim 1 in which the totalization column of the master sheet is separated from the body of the sheet by a weakened line, in combination with a recapitulation sheet and means thereon for securing thereto a plurality of totalization columns from similar master sheets, substantially as described.

4. In a system of the class described, a master sheet in combination with report sheets having data thereon similarly arranged with numerical data in a column thereon separated from the body of the sheet by a weakened line, said master sheet being provided with non-numerically-expressed data and with means for attaching the columns of numerically-expressed data from the report sheets thereto in laterally spaced relation, and a totalization column on said master sheet for said numerically-expressed data, substantially as described.

In testimony whereof we have signed our names to this specification in the presence of two subscribing witnesses.

LOUIS S. GRAHAM.
JOHN W. ROBERTS.
STANLEY WOOD.

Witnesses:
JOHN F. ELDEN, Jr.,
W. H. BOYNE.